Oct. 3, 1939.                W. C. GROENIGER                2,174,742
                              ANTISIPHON VALVE
                            Filed Aug. 3, 1937
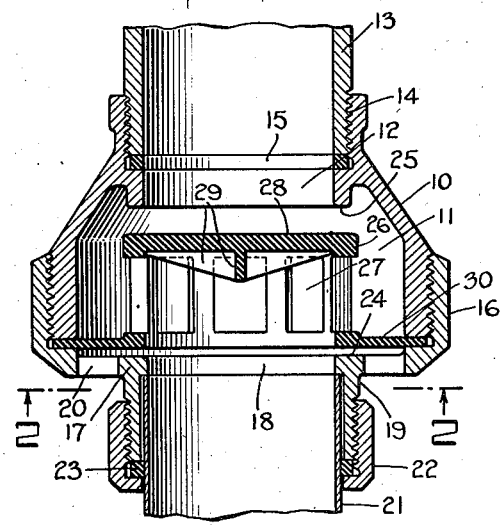
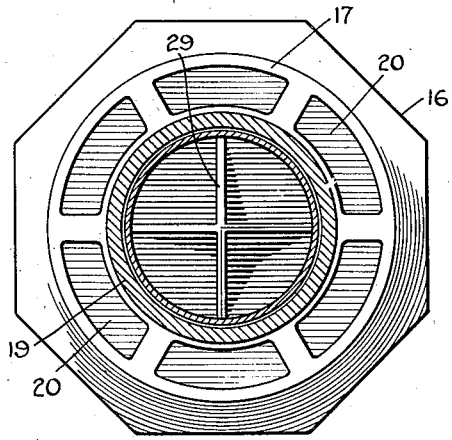
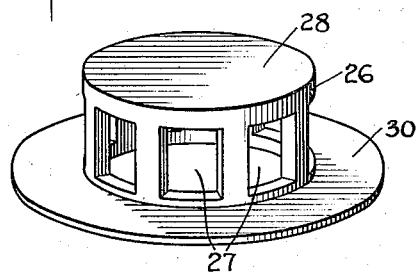
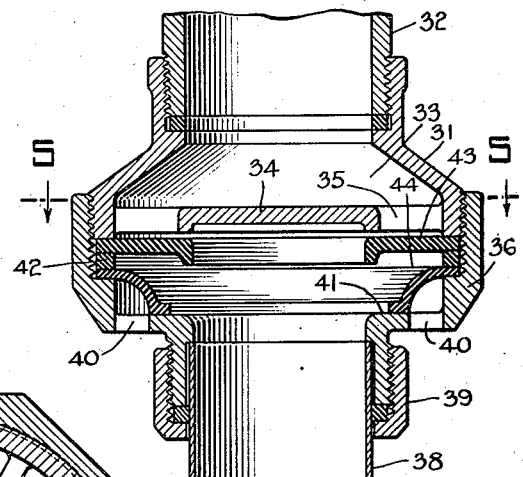
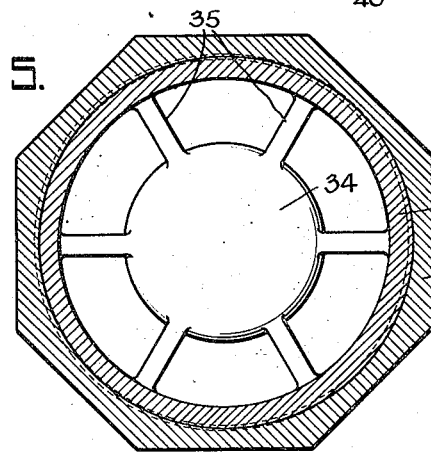
INVENTOR
William C. Groeniger
BY
ATTORNEY Patented Oct. 3, 1939

2,174,742

UNITED STATES PATENT OFFICE 2,174,742

ANTISIPHON VALVE

William C. Groeniger, Columbus, Ohio, assignor to John B. Pierce Foundation, New York, N. Y., a corporation of New York Application August 3, 1937, Serial No. 157,106

2 Claims. (Cl. 137—69)

My present invention relates to plumbing devices and more particularly to an improved device for preventing back flow of liquid to a source of water supply.

More particularly my invention is directed to a device for affording the flow of liquid in one direction only and to prevent return-flow of liquid under abnormal conditions, such as under vacuum or other low pressure conditions, in a water or other liquid supply system. Embodiments of my invention have been designed primarily for installation in a supply system leading from a source of potable water or other liquid supply and having a receiving receptacle served by such supply system, for the purpose of precluding the return flow of liquid from the receptacle into the supply system under all circumstances of use.

Preferred forms of my present invention embody a valve functioning as a check valve to preclude the return of liquid to a supply system under vacuum or other abnormal conditions, and which valve is associated with an air valve which permits the free access of air to the supply system together with means connected with the receiving receptacle to prevent or dissipate a siphon condition which may be created because of abnormal conditions arising in the water supply system.

The structure of my present invention is adapted to be inserted in a feed line between the water supply system and the receiving receptacle and functions practically as a means for hydraulically separating the water supply system from the receiving receptacle. When thus positioned, it functions practically as the open end of a pipe from which water or other liquid may be discharged and through which a return-flow of liquid or water is prevented under all circumstances of use.

A feature of my invention therefore is an improved check valve with back pressure control.

A feature of my invention is an improved valve having in combination therewith means for admitting a flow of air to the interior of the valve and which means is operable at all times.

Further features of my invention will appear as the description of the invention progresses.

In the accompanying drawing:

Fig. 1 is a view in sectional side elevation through a valve structure embodying my invention.

Fig. 2 is a view in sectional plan taken on the line 2—2 of Fig. 1.

Fig. 3 is a perspective view of the associated check and air valves utilized in Figs. 1 and 2.

Fig. 4 is a view in sectional side elevation through a valve structure embodying my invention; and Fig. 5 is a sectional plan view taken on the line 5—5 of Fig. 4.

Referring to the drawing and particularly for the moment to Figs. 1, 2 and 3, 10 designates a valve body provided with a chamber 11 therein and with an exit passage 12 to which an inlet pipe 13 may be connected in any suitable manner, preferably by means which will maintain a water-tight joint between the inlet passage 12 and the inlet pipe 13. This connection may take the form of a sweated connection or, as shown, a threaded connection 14 by interengaging threads formed on the end of the pipe 12 and on the outer end of the inlet passage 12. Also, and to further positively insure a tight joint I may arrange a washer 15 of resilient compressible material, such as rubber, between the end of the inlet pipe 13 and the material of the valve body 10.

Removably secured to the end of the valve body 10, remote from the inlet passage 12 is a member 16. This member 16 is provided with a diaphragm 17 having a central orifice 18, an extending outlet passage 19 and a plurality of arcuate openings 20 arranged about the circumference of the outlet passage 19. The outlet passage 19 is adapted to have a discharge pipe 21 secured thereto in any convenient manner, as by means of a nut 22 and washer 23 of flexible resilient material, such as rubber.

The material of the diaphragm 17 on the inner face thereof and surrounding the outlet passage 18 constitutes a valve seat 24. The inner end of the inlet passage 12 constitutes a valve seat 25 and both of the said valve seats 24 and 25 are located with the chamber 11 in the valve body 10.

Referring now to Fig. 3 there is shown in perspective a combined check and air valve. Such structure comprises a cylindrical body 26 of resilient material, such as rubber, of appropriate diameter and length and provided about its peripheral face with a plurality of spaced perforations 27 providing passages through which water or other liquid may flow. The upper end of the cylindrical body 26 is closed by an integrally formed diaphragm 28. The diaphragm 28 constitutes the check valve which cooperates with the valve seat 25 at the inner end of the inlet passage 22 to prevent under normal condition a return flow of water from the chamber 11 to the inlet pipe 13. For the purpose of stiffening or strengthening the active face of the diaphragm 28 I form integral therewith on the underside thereof ribs 29, as clearly shown in Figs. 1 and 2.

Formed integral with the cylindrical body portion 26 and extending outwardly therefrom at the end thereof remote from the integrally formed diaphragm 28 in a flange 30, the outer peripheral edge of which is adapted to be clamped between the open end of the body 10 and the nut 16, as clearly shown in Fig. 1. The under face of the flange 30 cooperates with the valve seat 24 and acts to control the flow of air from the outer atmosphere into the exit passage 18, and into the inner passage 12 through the perforations 24 in the cylindrical member 26.

The structure shown in Fig. 3 is positioned between the valve seats 24 and 25, as clearly shown in Fig. 1 and when in the position shown in Fig. 1, permits air to flow through the arcuate passages 20 in the diaphragm 17 between the flange 30 and the valve seat 24 and thence either downwardly through the exit passage 18 or upwardly through the perforations 27 into the chamber 11, and thence through the inlet passage 12.

Upon a reduction of pressure or the establishment of a condition of vacuum in the water supply system to which the inlet pipe 13 is connected, the diaphragm valve 28 moves upwardly toward the valve seat 25 and during such movement air passing through the arcuate passages 20 will flow upwardly through the inlet passage 12 and this will prevent an upward flow of water from the outlet passage 18 back into the inlet passage 12. Should the vacuum condition in the water supply system be relatively great in extent, the diaphragm valve 28 will engage with the valve seat 25 and positively shut off the possible flow of water from the outlet passage 18 into the inlet passage 12. Therefore, as the arcuate passages 20 above referred to are open, the level of the water in the chamber 11 will be lowered to a point below the valve seat 24. If under these conditions the diaphragm valve 28 breaks down, air will flow upwardly through the inlet passage 12, and prevent water or other fluid from being drawn into and through the inlet passage 12.

The flow of water through the inlet passage 12 into the chamber 11 and the flow of water against the diaphragm valve 28 will flex the flange valve 30 and will force the same into engagement with the valve seat 24, thus shutting off for the time being the admission of air to the chamber 11. Water may thus flow from the inlet pipe 13 around the diaphragm valve 28 and through the perforations 27 in the cylindrical member 26 downwardly into the exit passage 18. Therefore, the danger of water seeping through the arcuate passages 20 upon normal operation of the device is prevented.

Referring now to Figs. 4 and 5, there is shown an open ended body 31 connected in any suitable manner to an inlet pipe 32 and which valve body 31 has formed therein a chamber 33. At the open end of the valve body 11 is located a centrally arranged valve seat member 34 connected to the valve body 10 by a plurality of radially extending arms 35, the spaces between such arms constituting passages for water or other fluid.

Associated with the valve body 31 is a second body member 36 having means for removably connecting the same to the valve body 31. This second valve body 36 is provided on its lower end, as viewed in Fig. 4, with a centrally arranged exit pipe 37 to which is removably attached an exit pipe 38 by any suitable means, as for example the nut 39. The centrally arranged exit pipe 37 is connected to the second body member 36 by a plurality of radially extending arms 40 and the spaces between such arms act as passages through which air may flow. The inner end of the exit pipe 37 constitutes a valve seat 41 as does also the under peripheral edge of the valve seat member 34 of the valve body 31.

Clamped between the open end of the valve body 31 and the second valve body 36 and spaced from each other by a washer 42 are the valves 43 and 44 respectively. These valves are annular in form and are preferably composed of flexible resilient material such as rubber. They are held in position at their peripheral edge between the body 31 and body 36. The valve 43 co-acts with the valve seat formed on the under face of the valve seat member 34 to permit flow of water or other liquid from the inlet pipe 32 through spaces between the radially extending arms 35 and through the valve 43 into the exit pipe 36. The valve 44 co-acts with the valve seat 41 to prevent escape of water or entrance of air to the structure when water is flowing from the inlet pipe 32 to the exit pipe 38 as above described, but which will be out of engagement with such valve seat 41 when no water is flowing, or when a vacuum or other low pressure condition exists in the water supply system to which the inlet pipe 32 is connected. Under such conditions water will freely flow through the spaces between the radial arms 40 against the under face of the outlet valve 43 and will thus force said valve into engagement with its seat, preventing not only the passage of air into the inlet pipe 32 but preventing the passage of water to such pipe.

I claim:

1. In an improved air valve, the combination of a body having a chamber therein and inlet and outlet passages communicating therewith, means for connecting the inlet and outlet passages respectively in a supply line for liquids, valve seats formed at the inner end of the inlet and outlet passages and within the chamber, an annular valve member mounted within the chamber and normally separated from the outlet valve seat, air passages extending through the valve body and permitting flow of air into the outlet passage, a valve seat member formed integral with the annular valve member and supported thereon by a plurality of spaced members which permit flow of fluid from the chamber to the outlet passage, said last named valve member operating to engage with the valve seat at the exit end of the inlet passage upon the establishment of a back flow of fluid in the inlet passage, and said annular valve member engaging with the valve seat at the entrance end of the inlet passage upon flow of fluid from the inlet passage through the chamber into the outlet passage, whereby leakage of fluid is prevented through the air inlets.

2. In an improved air valve, the combination of a body provided with a chamber and having inlet and outlet passages communicating therewith, air inlet passages formed in said body and communicating with the chamber, valve seats formed at the entrance end of the inlet passage and the exit end of the outlet passage and within the chamber, an annular diaphragm valve located within the chamber and controlling the passage of air into the outlet passage and into the chamber, said annular diaphragm valve permitting flow of air into the chamber and into the outlet passage under normal conditions, a cage member formed integral with the annular diaphragm valve and extending upwardly therefrom and permitting flow of fluid from the inlet passage into the outlet passage and the flow of air into the inlet passage and outlet passage under normal conditions, a valve member formed integral with the cage member and spaced apart from the annular diaphragm valve member, said inlet valve member mounted on the cage and cooperating with the valve seat at the entrance end of the inlet passage to prevent back flow of fluid upon the establishment of back pressure within the inlet passage, and permitting flow of air through the air inlets and chamber into the inlet passage upon failure of the valve member to properly seat upon the valve seat at the entrance end of the inlet passage.

WILLIAM C. GROENIGER.